United States Patent [19]

Forster

[11] 4,247,230
[45] Jan. 27, 1981

[54] DEVICE FOR TRANSPORTING AND DELIVERING SLIDE FASTENERS TO A PACKING CASE

[75] Inventor: Karl-Heinz Forster, Roth, Fed. Rep. of Germany

[73] Assignee: Yoshida Kogyo K.K., Tokyo, Japan

[21] Appl. No.: 974,604

[22] Filed: Dec. 29, 1978

[30] Foreign Application Priority Data

Jan. 16, 1978 [DE] Fed. Rep. of Germany ....... 2801686

[51] Int. Cl.³ .............................................. B65G 51/02
[52] U.S. Cl. ...................................... 406/88; 414/676
[58] Field of Search ....................... 406/88, 86, 89, 83; 198/403, 408; 414/676

[56] References Cited

U.S. PATENT DOCUMENTS 4,128,377  12/1978  Bramati ........................... 198/403 X
4,160,567  7/1979   Merz ................................. 406/151 X Primary Examiner—Robert B. Reeves
Assistant Examiner—Gene A. Church
Attorney, Agent, or Firm—Hill, Van Santen, Steadman, Chiara & Simpson

[57] ABSTRACT

An improved device for transporting and delivering slide fasteners or the like to a packing case comprises a horizontal transporting rail which is rotatable around its longitudinal axis by 180°, and a means using compressed air for advancing the slide fasteners which have successively been fed to one end of the rail, whereby the transported slide fasteners are successively and automatically turned down into the packing case. Thus the manual labor of collecting the slide fasteners of certain lengths into a packing case for a subsequent treatment as done in the prior art can be eliminated.

6 Claims, 2 Drawing Figures

DEVICE FOR TRANSPORTING AND DELIVERING SLIDE FASTENERS TO A PACKING CASE

BACKGROUND OF THE INVENTION

1. Field of the Invention

The present invention relates to a device for transporting and delivering slide fasteners or the like to a packing case.

2. Prior Art

In the manufacture of slide fasteners it is disadvantageous to successively produce, as it is normally done, a plurality of slide fasteners of predetermined length and to size and collect them in a container prior to their being fed individually or manually to a packing case for being further handled. It has been attempted to use machines for gripping the slide fasteners in the container, removing them successively and aligning them, but a good result has not been achieved as yet. It has proved in practice that for this state of the art superfluous, skilled workers are necessary.

SUMMARY OF THE INVENTION

It is the object of the present invention to provide a device for transporting and delivering slide fasteners or the like to a packing case or the like, by means of which the deficiency encountered in the prior are techniques can be overcome.

A device according to the invention by which this object is solved includes a horizontally supported transport rail which is rotatable about its longitudinal axis by 180°, comprising a means for advancing the slide fasteners, which are successively fed to one end of the rail, to a rail area above the packing case or the like. Subsequent to the last step the slide fasteners are successively fed to that one end of the transport rail. By way of the rail they arrive successively at the rail area above the packing case, and then they are fed to the packing case or the like, which is situated beneath the rail, just by rotation of the rail by 180°. No worker is necessary for this step, who would otherwise have to remove the individual slide fasteners from a container and align them relative to the packing case prior to inserting it into the case.

DETAILED DESCRIPTION OF THE INVENTION

Figure 1:
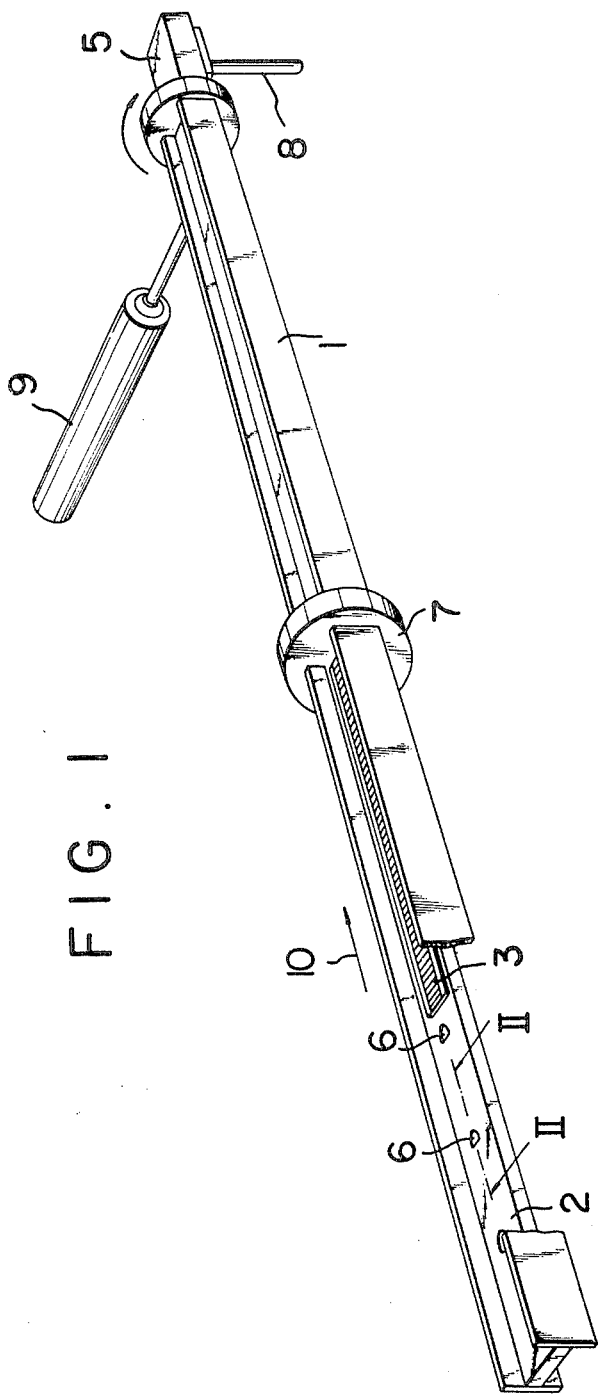
FIG. 1 is a perspective view of a transport rail constituting a device for transporting and delivering slide fasteners in accordance with the present invention.

If a transport rail, which is rotatable by 180° in each step, were equipped, for example, with a driven conveyor belt which corresponds to the width of the slide fastener, it would however be necessary to reverse the conveyor belt each time the rail is pivoted by 180°. For this reason, an embodiment of the invention has provided particularly practical where the means serving to advance the slide fasteners on the rail is formed as a channel which is mounted in the rail and connectable to a compressed-air source. The channel comprises nozzles which extend to the slide fastener rail-supporting surface and which are directed obliquely relative to the transport direction. The compressed air flows through the oblique nozzles to the lower side of the slide fastener, which rests on the top rail-supporting surface and is advanced by the compressed air. The conveying speed can easily be controlled by throttling the rate of air flow. Instead of a continuous air supply, a fixed-duration air supply may be used for predetermining the end position of the slide fastener before the rail is rotated by 180° and the slide fastener is released to an adjoining conveyor tape or into a packing case situated beneath.

It is advantageous to provide the central bar of the rail, whose cross-section is "H"-shaped, with the channel that is connectable to the compressed air source.

Depending on the size of the slide fasteners to be transported and consequently the size of the packing cases used, it is advantageous to predetermine that point on the rail where the slide fastener advance should be interrupted. To this end an adjustable abutment ring on the rail serves to limit the effective length of the conveying track of the slide fasteners and is displaceable longitudinally of the rail. The adjusting ring has preferably the form of a disk with a central recess of "H" shape, the cross-section of which corresponds to that of the rail. For rotating the rail by 180° a stepping mechanism is provided, to which a gear mechanism is associated.

To make the rail to rotate around its axis in one direction only, a piston-cylinder-unit comprising a toothed rack and a free-run mechanism is used.

The compressed air supply may be particularly simple and practical by connecting one end of the rail channel to the compressed air source via a rotational connector.

The advantages and features of the present invention will become apparent from the following description, taken with reference to the accompanying drawing, in which an illustrative embodiment of the invention is shown.

A device according to the invention comprises a horizontally supported transport rail 1, which is rotatable about its longitudinal axis by 180° and has an "H"-shaped cross-section. A central bar 2 of the transport rail 1, whose two outersurfaces serve as support surfaces for slide fasteners 3 to be advanced successively along the rail, comprises a channel 4 which is connected, at one end of the rail, to a compressed air source (not shown) via a rotational connector 5 known per se.

Figure 2:
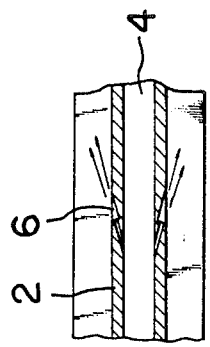
FIG. 2 is a sectional view of the transport rail taken along the line II—II of FIG. 1.

As shown in FIG. 2, the channel 4 is provided with nozzles 6 which extend towards the slide fastener rail-supporting surfaces and run obliquely in the conveying direction. An adjusting ring 7 is mounted on the rail 1, which ring serves as an abutment for limiting the conveying track of slide fasteners 3 and is displaceable longitudinally of the rail. The adjusting ring 7 has the form of a disk with a central recess shaped as the letter "H", the cross-section of which corresponds to that of the rail 1. At the end of the rail 1 adjacent to the rotational connector 5 is mounted a free-run mechanism or one-way clutch 8 (which is known per se and shown merely schematically) by means of which rail 1 can be rotated around its axis in just one direction by means of a piston-cylinder-unit 9 by means of an interposed toothed rack (not shown).

The device according to the invention functions as follows. Compressed air is fed into the channel 4 via the rotational connector 5 emerges through the oblique nozzles 6 beneath the slide fastener 3 resting upon the rail-supporting surface. The slide fastener is therefore transported in the direction of the arrow 10 until it abuts against the adjusting ring 7. The transport speed can be controlled by throttling the compressed air fed to the channel 4 via rotational connector 5. It is also feasible to supply the air intermittently, so as to advance the slide fastener in steps. As soon as the slide fastener abuts against the adjusting ring 7 which determines its end position, the rail is rotated around its axis for 180° by actuation of the piston-cylinder-unit 9. The slide fastener 3 then falls to a conveyor belt situated beneath the rail or directly into a packing case. Once the rail is rotated by 180° to release the slide fastener, the support surface of the central bar of rail 1, which surface is then situated on top, is ready to receive the next slide fastener.

The device in accordance with the present invention may be used for the transportation and delivery to a packing case of not only slide fasteners, but also other pieces of lengthy, narrow strips, such as cloth tapes and the like, in a similar manner and with a similar result.

What is claimed is:

1. A device for transporting and delivering slide fasteners or the like to a packing case comprising: a horizontally supported transporting rail which is rotatable around its longitudinal axis by 180°; and means for longitudinally advancing the slide fasteners, which have successively been fed to one end of said rail, to a rail portion situated above the packing case, said advancing means including a hollow channel provided in the rail and connectable to a compressed air source, said channel having nozzles which extend toward a slide-fastener supporting surface of said rail, said nozzles being obliquely directed in the direction of conveyance; and said rail having a cross-section in the form of the letter "H", a central, bar thereof including said channel.

2. A device according to claim 1, including an abutment ring mounted on said rail, said ring being displaceable longitudinally of said rail and serving as an abutment for limiting the effective length of said supporting surface on both sides of said central bar.

3. A device according to claim 2, said adjusting ring having the shape of a disk within an "H"-shaped central recess having a cross-section corresponding to that of said rail.

4. A device according to claim 1, including a rotational connector connected to said channel at one end of said rail and adapted to be connected to the compressed air source.

5. A device according to claim 1 including means connected to said rail for rotating it one-half revolution.

6. A device for transporting and delivering slide fasteners or the like to a packing case comprising:
 (a) a horizontally supported transporting rail which is rotatable around its longitudinal axis by 180°;
 (b) means for longitudinally advancing the slide fasteners, which have successively been fed to one end of said rail, to a rail portion situated above the packing case, said advancing means including a hollow channel provided in said rail and connectable to a compressed air source, said channel having nozzles which extend toward a slide-fastener-supporting surface of said rail, said nozzles being obliquely directed in the direction of conveyance; and
 (c) an abutment ring mounted on said rail, said ring being displaceable longitudinally of said rail and serving as an abutment for limiting the effective length of said slide-fastener-supporting surface.

* * * * *